(No Model.) 2 Sheets—Sheet 1.

C. R. PURNELL.
SCREW PROPELLER.

No. 535,172. Patented Mar. 5, 1895.

Witnesses:
Thomas M. Smith
Richard C. Maxwell

Inventor:
Charles R. Purnell,
By J. Walter Douglass.
Attorney

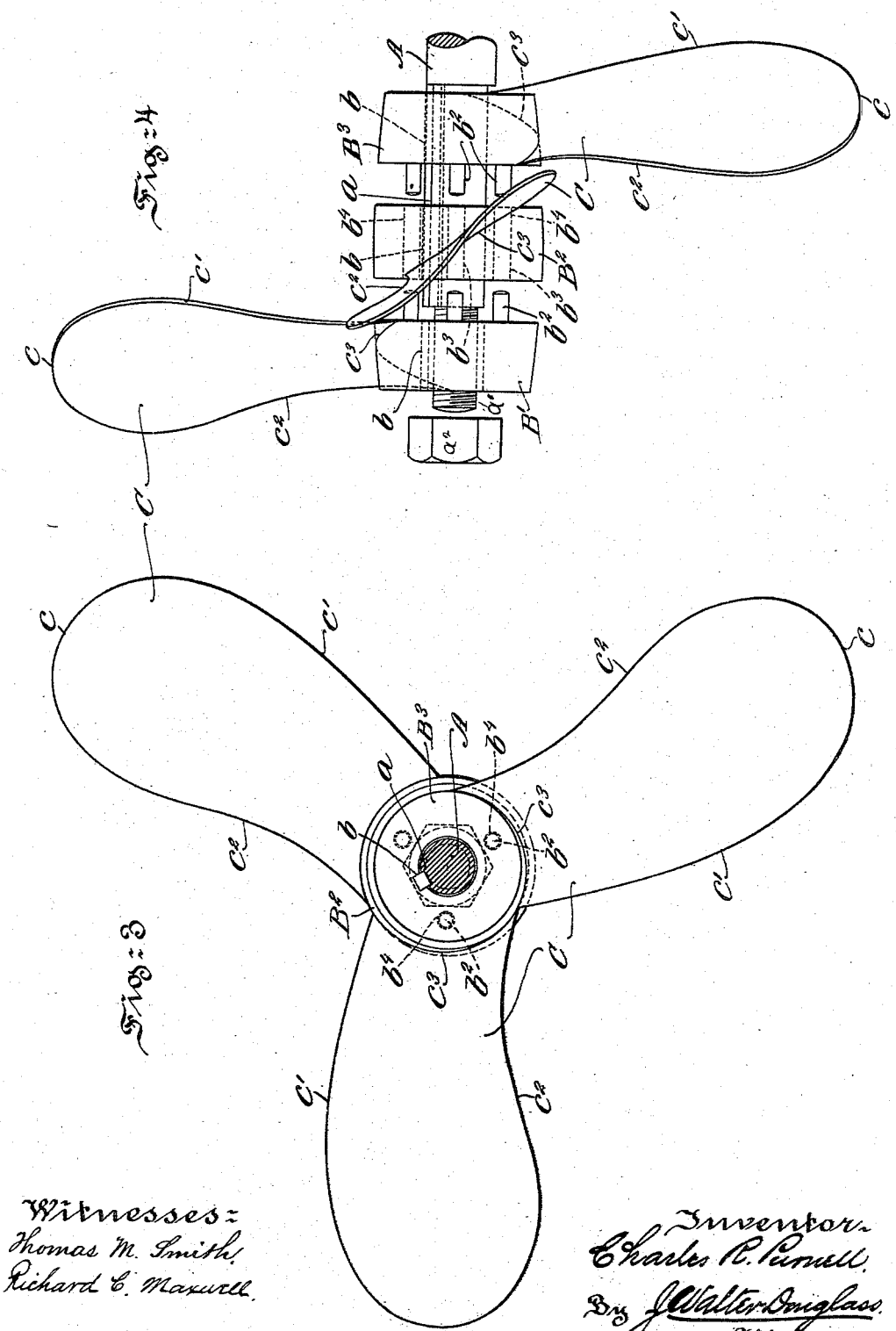

UNITED STATES PATENT OFFICE.

CHARLES R. PURNELL, OF PHILADELPHIA, PENNSYLVANIA, ASSIGNOR OF ONE-HALF TO RICHARD SHEVLIN, OF SAME PLACE.

SCREW-PROPELLER.

SPECIFICATION forming part of Letters Patent No. 535,172, dated March 5, 1895.

Application filed November 16, 1894. Serial No. 528,973. (No model.)

*To all whom it may concern:*

Be it known that I, CHARLES R. PURNELL, a citizen of the United States, residing at the city of Philadelphia, in the county of Philadelphia and State of Pennsylvania, have invented certain new and useful Improvements in Screw-Propellers, of which the following is a specification.

My invention has relation to screw propeller wheels or blades for steamships and other crafts; and in such connection it relates particularly to the construction and arrangement of the blades and location on a shaft to constitute the propeller wheel or screw for said purposes.

The principal objects of my invention are, first, to provide a screw propeller in which the greatest possible efficiency or impelling power is derived therefrom, with friction and slip lessened; second, to provide a propeller wheel or screw for ships or other crafts, in which the blades are disposed one after the other and so as to describe in position on a hub engaging a feathered shaft a true screw formation and contacting with each other at their junction at said hub in order to induce an impelling power or force in a body or volume of water and with slip and resisting friction lessened in the working of the same; and, third, to provide a screw propeller having curved wing blades arranged in advance of one another on a hub or hubs mounted on a feathered shaft and each without being influenced by the other in working, performing its functions to derive a maximum impelling power or force due to the particular construction and arrangement and manner in which the blades thereof enter and leave the body or volume of water and displace the same in their travel therethrough.

My invention stated in general terms, consists of a screw-propeller constructed and arranged in substantially the manner hereinafter described and claimed.

The nature, objects and scope of my invention will be more fully understood from the following description taken in connection with the accompanying drawings forming part hereof, and in which—

Figure 1:
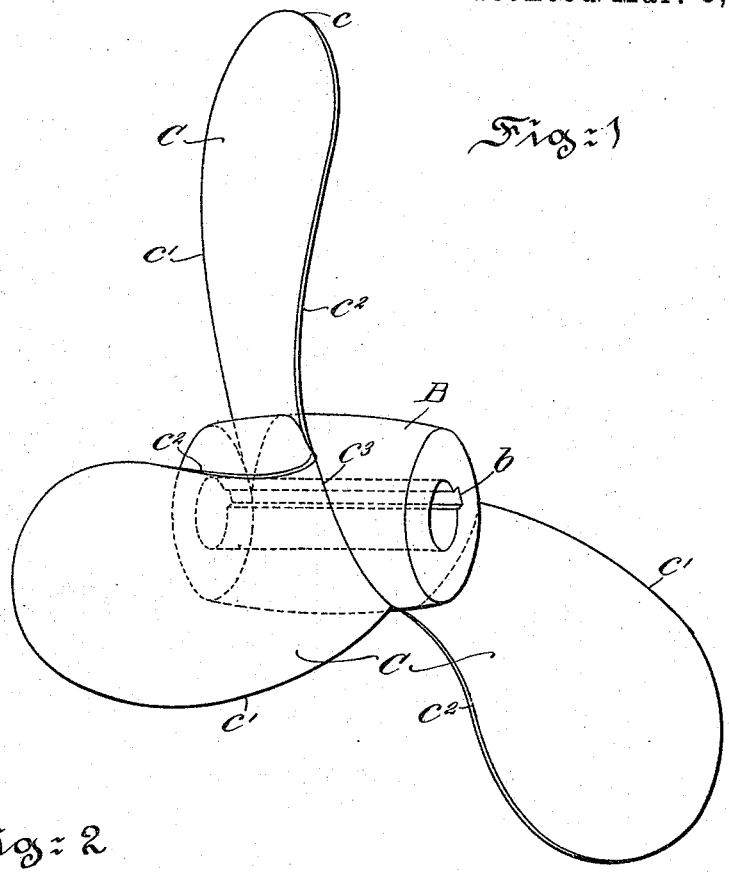
Figure 2:
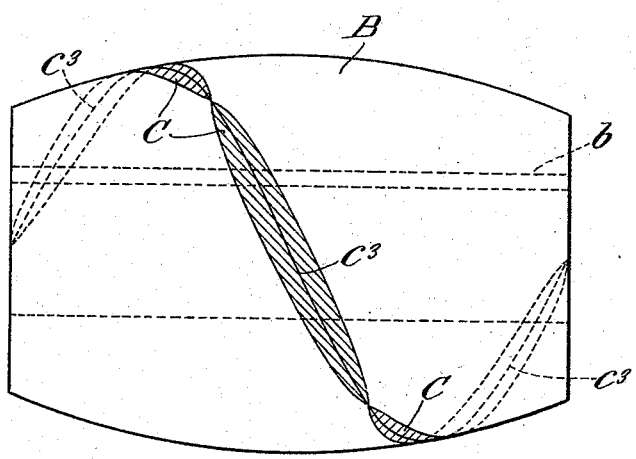

Figure 1, is a perspective view of a screw propeller, showing the formation, particular arrangement or position of the blades in connection with a solid hub adapted to be mounted on a propeller shaft and embodying characteristic features of my present invention. Fig. 2, is an elevational view of the hub and a sectional view through the curved wing-shaped blades of the screw propeller, arranged one in advance of the other and describing in outline a true screw formation and so as to act independently of each other. Fig. 3, is a side elevational view of a slightly modified form of screw-propeller of my invention, with the respective wing-shaped blades thereof arranged on separate hubs adapted to engage a feathered shaft and provided with keys or pins engaging openings provided in their companion hub or hubs to receive the same; and Fig. 4, is a similar view showing the hubs detachably supported on a feathered shaft to illustrate the manner of detaching one from the other thereon.

Referring to the drawings A, is the propeller shaft provided with a longitudinal feather $a$, to which is secured against turning thereon a complemental hub B, provided with an internal longitudinal groove or channel $b$.

C are the blades set into or formed integral with a solid hub B, as illustrated in Figs. 1 and 2. These blades C, in the form of wings are slightly curved from the hub to the end $c$, and increase in width from the hub to said end $c$, thereof. In shape or form each of the blades has a convex outline $c'$, from the hub to the end $c$, such being the outer contour thereof, while the inner line $c^2$, of each blade is concavo-convex to the end $c$, thereof. Each of the blades occupies a position in connection with the hub B, at a diagonal plane $c^3$, thereto and contacting with each other at their junction at the said hub in such manner as that each blade in its position or connection with said hub B, describes a true screw in formation and in order that the respective blades may each be permitted to perform its function independently of the others in creating an impelling force or power against a body or volume of water, with back lash or slip and resisting friction upon the blades lessened in the body of water. Hitherto as screw propellers have been arranged they tended to retard the individual blades thereof as each was brought into action through the rotation of the same in the body of water, but a propeller constructed according to my invention acts in a contrary manner, whereby a maximum energy, as a propelling force against a body or volume of water to be displaced is insured; and hence a far greater rate of speed than was hitherto possible, is obtained. In a word, appreciably increasing the speed of the ship or other craft, which is entirely due to the particular construction and arrangement of the blades on the hub or hubs thereof. Practice has demonstrated that five or more knots per hour greater speed can be readily obtained with my propeller as compared with the best wheel now in use on ships or similar crafts, as a means of moving the same through a volume or body of water.

In Figs. 3 and 4, the construction and arrangement of the series of blades C, of the propeller are the same as hereinbefore described with the exception, that instead of forming them with a solid hub B, they are secured to or formed integral with separable hubs B′, B², and B³, mounted on a shaft A, provided with a feather $a$. The hubs B′ and B³, are each provided with a series of end pins or keys $b^2$, adapted to enter complemental openings $b^3$ and $b^4$, provided in the end walls of the hub B², as clearly illustrated in Fig. 4, whereby the respective hubs with their curved wing blades C, arranged one in advance of the other, may be quickly locked to required position on the feathered shaft A, against longitudinal movement and also against rotary movement, and so as to permit each to perform its function, while independent of the other, yet with geometrical precision as to their entry of the body or volume of water one after the other, thus insuring a maximum energy or impelling power to be derived and far greater speed than was hitherto possible. One end of the shaft A, may be threaded at $a'$, for the reception of a nut $a^2$, as shown in Fig. 4, or the shaft may have formed integral therewith a cap or nut in order that the hub member B′, may bear against the same and thereby prevent any displacement of the same in operation.

Having thus described the nature and objects of my invention, what I claim as new, and desire to secure by Letters Patent, is—

1. A screw propeller provided with a feathered shaft, three blades connected with an internally grooved hub mounted on said shaft each blade having convex and concavo-convex outlines, said blades also being arranged so that they follow each other after the manner of an interrupted screw and contact with each other at their junction at the hub, the construction being such as to induce a propelling force against a body of water and with slip and resisting friction on said blades lessened, substantially as described.

2. A screw propeller provided with a feathered shaft, internally grooved separable hubs locking by means of pins and openings mounted on said shaft, and each hub provided with a blade having convex and concavo-convex outlines and the said blades in normal position diagonally positioned to their hubs, one after the other so as to act independently of one another in inducing a propelling force against a body of water, substantially as shown and described.

In testimony whereof I have hereunto set my signature in the presence of two subscribing witnesses.

CHARLES R. PURNELL.

Witnesses:
 WILLIAM GRAHAM,
 HENRY LEWIS.